(12) United States Patent
Valve (10) Patent No.: US 6,449,593 B1
(45) Date of Patent: Sep. 10, 2002

(54) METHOD AND SYSTEM FOR TRACKING HUMAN SPEAKERS

(75) Inventor: Päivi Valve, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/482,825

(22) Filed: Jan. 13, 2000

(51) Int. Cl.[7] .............................................. G10L 11/02
(52) U.S. Cl. ...................................... 704/233; 704/270
(58) Field of Search ................................. 704/233, 248, 704/270, 275, 272, 200, 200.1

(56) References Cited

U.S. PATENT DOCUMENTS

| | | | | |
|---|---|---|---|---|
| 4,741,038 A | * | 4/1988 | Elko et al. ................... | 367/121 |
| 4,893,289 A | * | 1/1990 | Greenwood et al. ......... | 367/129 |
| 5,335,011 A | * | 8/1994 | Addeo et al. ............... | 348/14.1 |
| 5,737,430 A | * | 4/1998 | Widrow ....................... | 381/312 |

FOREIGN PATENT DOCUMENTS

EP       0901267       3/1999       ............ H04M/9/08

OTHER PUBLICATIONS

GSM Draft EN 300 965 v6.0.0 (Jan. 1999), Digital Cellular Telecommunications System (Phase 2+), "Full Rate Speech Voice Activity Detector (VAD) for Full Rate Speech Traffic Channels", (GSM 06.32 version 6.0.0 Release 1997).
"Voice Source Localization for Automatic Camera Pointing system in Videoconferencing", H. Wang et al, *Proc. IEEE 1997 Workshop on Appl. of Signal Processing to Audio and Acoustics*, 1997.
"A signal Subspace Tracking Algorithm for Microphone Array Processing of Speech", S. Affes et al, *IEEE Transactions on Speech and Audio Processing*, Sep. 1997, vol. 5, No. 5, pp. 425–437.
"A Self–Steering Digital Microphone Array", W. Kellerman, *Proc. ICASSP–91*, pp. 3581–3584.
"Audiodirective Microphone Systems", J. Flanagan et al, *Acoustica*, vol. 73 (1991), pp. 58–71.
"A self–steering digital microphone array"; W. Kellerman; IEEE International Conference on Acoustics, Speech & Signal Processing; vol. 2, Conf. 16, Apr. 14, 1991, pp. 3581–3584.
"A practical methodology for speech source localization with microphone arrays", M. Brandstein et al., *Computer Speech and Language*, Academic Press, vol. 11, No. 2, Apr. 1, 1997, pp. 91–126.
"A microphone array for car environments", Y. Grenier, *Speech Communication*, Elsevier Schience Publishes, vol. 12, No. 1, Mar. 1, 1993, pp. 25–39.

* cited by examiner

Primary Examiner—Richemond Dorvil
(74) *Attorney, Agent, or Firm*—Ware, Fressola, Van Der Sluys & Adolphson LLP (57) ABSTRACT

A method and system for tracking human speakers using a plurality of acoustic sensors arranged in an array to detect the voice of the speakers within an angular range in order to determine a most favorable direction for detecting the voice in a detection period. A beamformer is used to form a plurality of beams each covering a different direction within the angular range and generate a signal responsive to the voice of the speakers for each beam. A comparator is used to periodically compare the power level of the signal of different beams in order to determine the most favorable detection direction according to the movement of the human speakers. A voice activity detection device is used to indicate to the comparator when the voice of the speakers is detected so that the comparator determines the most favorable detection direction based on the voice of the speakers and not the noise when the speakers are silent during the detection period.

23 Claims, 4 Drawing Sheets

METHOD AND SYSTEM FOR TRACKING HUMAN SPEAKERS

FIELD OF THE INVENTION

The present invention relates generally to a microphone array that tracks the direction of the voice of human speakers and, more specifically, to a hands-free mobile phone.

BACKGROUND OF THE INVENTION

Mobile phones are commonly used in a car to provide the car driver a convenient telecommunication means. The user can use the phone while in the car without stopping the car or pulling the car over to a parking area. However, using a mobile phone while driving raises a safety issue because the driver must constantly adjust the position of the phone with one hand. This may distract the driver from paying attention to the driving.

A hands-free car phone system that uses a single microphone and a loudspeaker located at a distance from the driver can be a solution to the above-described problem, regarding the safety issue in driving. However, the speech quality of such a hands-free phone system is far inferior than the quality usually attainable from a phone with a handset supported by the user's hand. The major disadvantages of using the above-described hands-free phone system arise from the fact that there is a considerable distance between the microphone and the user's mouth and that the noise level in a moving car is usually high. The increase in the distance between the microphone and the user's mouth drastically reduces the speech-to-ambient noise ratio. Moreover, the speech is severely reverberated and thus less natural and intelligible.

A hands-free system with several microphones, or a multi-microphone system, is able to improve the speech-to-ambient noise ratio and make the speech signal sound more natural without the need of bringing the microphone closer to the user's mouth. This approach does not compromise the comfort and convenience of the user.

Speech enhancement in a multi-microphone system can be achieved by an analog or digital beamforming technique. The digital beamforming technique involves a beamformer that uses a plurality of digital filters to filter the electro-acoustic signals received from a plurality of microphones and the filtered signals are summed. The beamformer amplifies the microphone signals responsive to sound arriving from a certain direction and attenuates the signals arriving from other directions. In effect, the beamformer directs a beam of increased sensitivity towards the source in a selected direction in order to improve the signal-to-noise ratio of the microphone system. Ideally, the output signal of a multi-microphone system should sound similar to a microphone that is placed next to the user's mouth.

Beamforming techniques are well-known. For example, the article entitled "Voice source localization for automatic camera pointing system in videoconferencing", by H. Wang and P. Chu (Proceedings of IEEE 1997 Workshop on Applications of Signal Processing to Audio and Acoustics, 1997) discloses an algorithm for voice source localization. The major drawback of this voice source localization algorithm is that it is only applicable to a microphone system wherein the space between microphones is sufficiently large, 23 cm (9") used in one direction and 30 cm (11.7") used in the other direction. Moreover, the performance of the disclosed microphone system is not reliable in an environment where the ambient noise levels are high and reverberation is severe.

The article entitled "A signal subspace tracking algorithm for microphone array processing of speech", by S. Affes and Y. Grenier (IEEE Transaction on Speech and Audio Processing, Vol.5, No.5, pp.425–437, September 1997) describes a method of adaptive microphone array beamforming using matched filters with subspace tracking. The performance of the system as described by S. Affes and Y. Grenier is also not reliable when the ambient noise levels and reverberation are high. Furthermore, this system only allows the user to move slightly, in a circle of about 10 cm (2.54") radius. Thus, the above-described systems cannot reliably perform in an environment of a moving car where the ambient noise levels are usually high and there can be more than one human speaker who has a reasonable space to move around.

U.S. Pat. No. 4,741,038 (Elko et al) discloses a sound location arrangement wherein a plurality of electro-acoustical transducers are used to form a plurality of receiving beams to intercept sound from one or more specified directions. In the disclosed arrangement, at least one of the beams is steerable. The steerable beam can be used to scan a plurality of predetermined locations in order to compare the sound from those locations to the sound from a currently selected location.

The article entitled "A self-steering digital microphone array", by W. Kellermann (Proceeding of ICASSP-91, pp. 3581–3584, 1991) discloses a method of selecting the beam direction by voting using a novel voting algorithm.

The article entitled "Autodirective Microphone System" by J. L. Flanagan et al (Acoustica, Vol. 73, pp.58–71, 1991) discloses a two-directional beamforming system for an auditorium wherein the microphone system is dynamically steered or pointed to a desired talker location.

However, the above-described systems are either too complicated or they are not designed to perform in an environment such as the interior of a moving car where the ambient noise levels are high and the human speakers in the car are allowed to move within a broader range. Furthermore, the above-described systems do not distinguish the voice from the near-end human speakers from the voice of the far-end human speakers through the loudspeaker of a hands-free phone system.

SUMMARY OF THE INVENTION

The first aspect of the present invention is to provide a system that uses a plurality of acoustic sensors for tracking at least one human speaker in order to effectively detect the voice from the human speaker, wherein the human speaker and the acoustic sensors are separated by a speaker distance along a speaker direction, and wherein the human speaker is allowed to move relative to the acoustic sensors resulting in a change in the speaker direction within an angular range, and wherein each acoustic sensor produces an electrical signal responsive to the voice of the human speaker. The system comprises: a) a beamformer operatively connected to the acoustic sensors to receive the electrical signal, wherein the beamformer is capable of forming N different beams, and each of the beams defines a favorable direction to detect the voice from the human speaker by the acoustic sensors and each different beam is directed in a substantially different direction within the angular range, and wherein the beamformer further outputs for each beam a beam power responsive to the voice detected by the acoustic sensors; and b) a comparator operatively connected to the beamformer for comparing the beam power of each beam in order to determine a most favorable direction to detect the voice of the human speaker, wherein the comparator compares the beam power of each beam periodically so as to determine the most favorable detection direction according to the change in the speaker direction.

The second aspect of the present invention is to provide a method of tracking at least one human speaker using a plurality of acoustic sensors in order to effectively detect the voice from the human speaker, wherein the human speaker and the acoustic sensors are separated by a speaker distance along a speaker direction, and wherein the human speaker is allowed to move relative to the acoustic sensors resulting in a change in the speaker direction within an angular range, and wherein each acoustic sensor produces an electrical signal responsive to the voice of the speaker. The method includes the steps of: a) forming N different beams from the electrical signal such that each beam defines a favorable direction to detect the voice of the human speaker by the acoustic sensors and each different beam is directed in a substantially different direction within the angular range, wherein each beam has a beam power responsive to the electrical signal; and b) periodically comparing the beam power of each beam in order to determine the most favorable direction to detect the voice of the human speaker according to the change of the speaker direction.

The present invention will become apparent upon reading the description taken in conjunction with FIG. 1 to FIG. 4.

DETAILED DESCRIPTION

Figure 1:
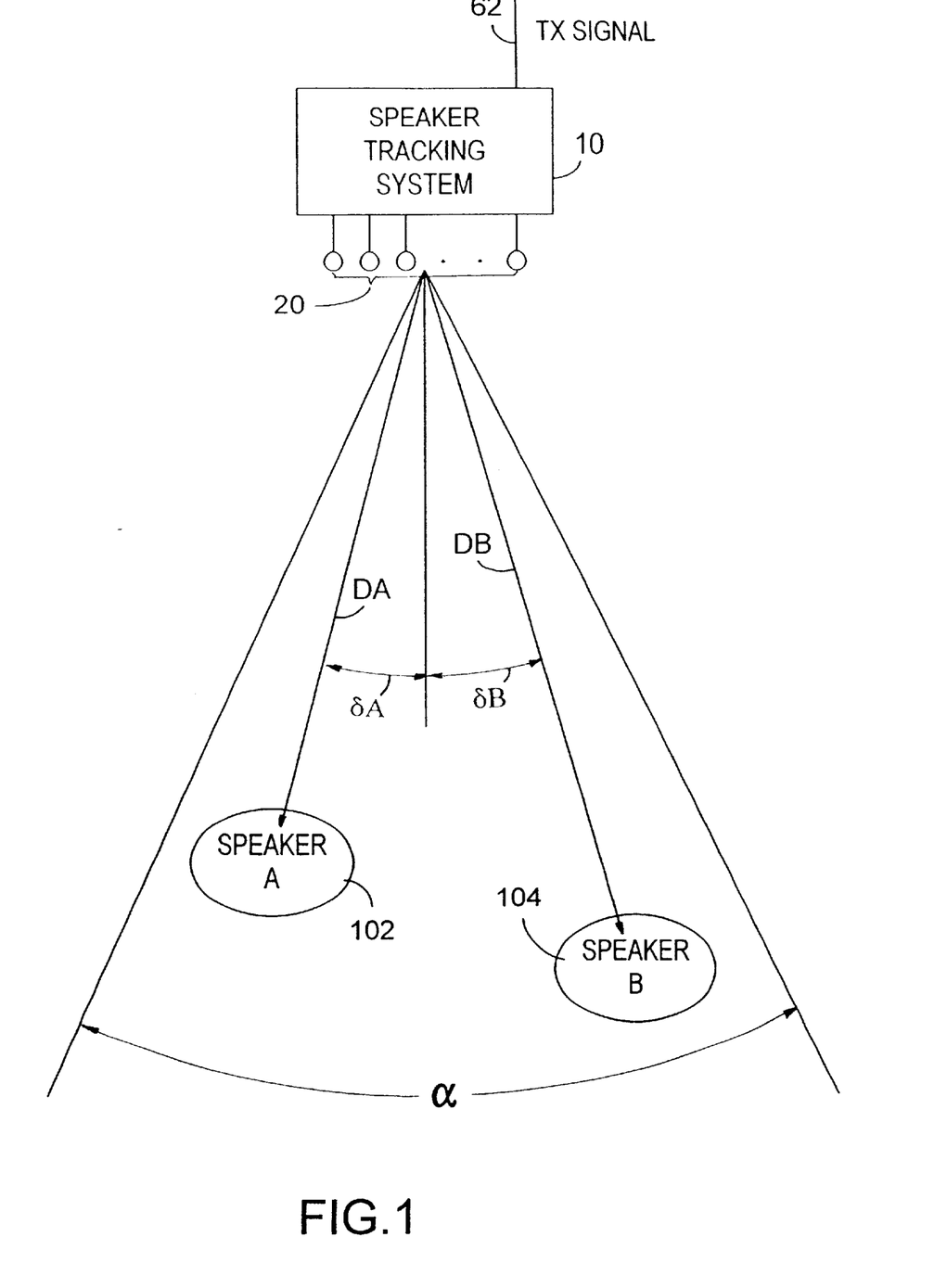
FIG. 1 is a schematic representation of a speaker tracking system showing a plurality of microphones arranged in an array to detect the sounds from two human speakers located at different distances and in different directions.

FIG. 1 shows a speaker tracking system 10 including a plurality of microphones or acoustic sensors 20 arranged in an array for detecting and processing the sounds of human speakers A and B who are located in front of the speaker tracking system 10. This arrangement can be viewed as a hands-free telephone system for use in a car where speaker A represents the driver and speaker B represents a passenger in the back seat. In practice, the speakers are allowed to move within a certain range. The movement range of speaker A is represented by a loop denoted by reference numeral 102. The approximate distance of speaker A from the acoustic sensors 20 is denoted by DA along a general direction denoted by an angle δA. Similarly, the movement range of speaker B is denoted by reference numeral 104, and the approximate distance of speaker B from the acoustic sensors 20 is denoted by DB along a general direction denoted by an angle δB.

The speaker tracking system 10 is used to select a favorable detection direction to track the speaker who speaks. In considering the movement ranges and the locations of the speakers, the speaker tracking system 10 is designed to form N different beams to cover N different directions within an angular range, α. Each beam approximately covers an angular range of α/N. The signal responsive to the voice of the speaker as detected in the favorable detection direction is denoted as output signal 62 (Tx-Signal). The output signal 62 which can be in a digital or analog form, is conveyed to the transceiver (FIG. 2) so that speakers A and B can communicate with a far-end human speaker at a remote location.

Preferably, the acoustic sensors 20 are arranged in a single array substantially along a horizontal line. However, the acoustic sensors 20 can be arranged along a different direction, or in a 2D or 3D array. The number of the acoustic sensors 20, is preferably between 4 to 6, when the speaker tracking system 10 is used in a relatively small space such as the interior of a car. However, the number of the acoustic sensors 20 can be smaller or greater, depending on the available installation space and the desired beam resolution.

Preferably, the spacing between two adjacent acoustic sensors 20 is about 9 cm (3.54"). However, the spacing between any two adjacent acoustic sensors can be smaller or larger depending on the number of acoustic sensors in the array.

Preferably, the angular range α is about 120 degrees, but it can be smaller or larger.

Preferably, the number N of the beams is 6 to 8, but it can be smaller or larger, depending on the angular coverage of the beams and the desired beam resolution. It should be noted, however, that the coverage angle α/N for each beam is estimated only from the main lobe of the beam. In practice, the coverage angle of the side-lobes is much larger than α/N.

Figure 2:
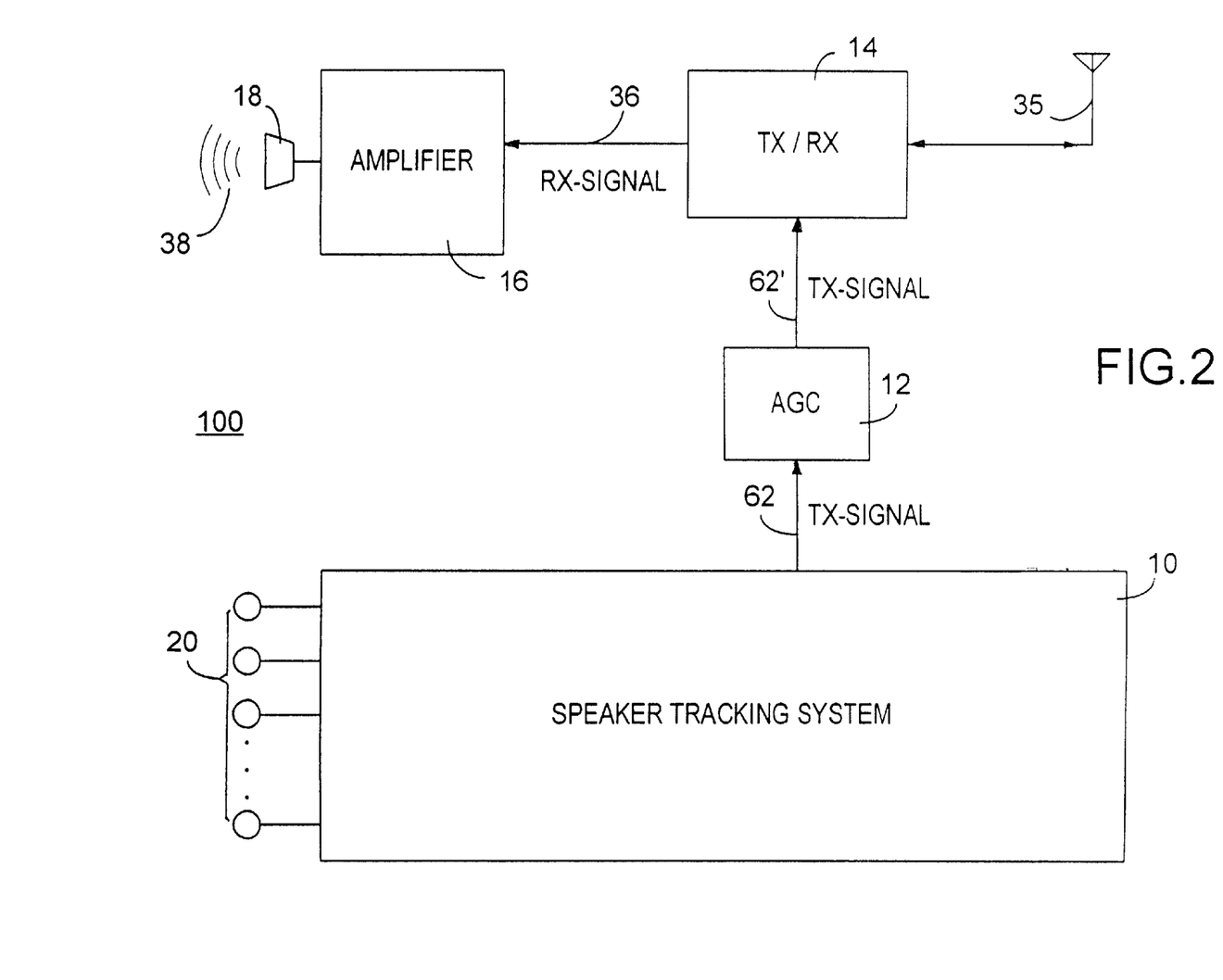
FIG. 2 is a block diagram showing the speaker tracking system being connected to a transceiver to be used as a telecommunication device.

FIG. 2 illustrates a telecommunication device 100, such as a hands-free phone, using the speaker tracking system of the present invention. The telecommunication device 100 allows one or more near-end human speakers (A, B in FIG. 1) to communicate with a far-end human speaker (not shown) at a remote location. As shown, the output signal 62 (Tx-Signal) is conveyed to a transceiver 14 for transmitting to the far-end speaker. Optionally, a gain control device 12 is used to adjust the power level of the output signal 62.

The far-end signal 36 (Rx-Signal) received by the transceiver 14 is processed and amplified by an amplifier 16. A loudspeaker 18 is then used to produce sound waves responsive to the processed signal so as to allow the near-end speakers to hear the voice of the far-end speaker in a hands-free fashion.

Figure 3:
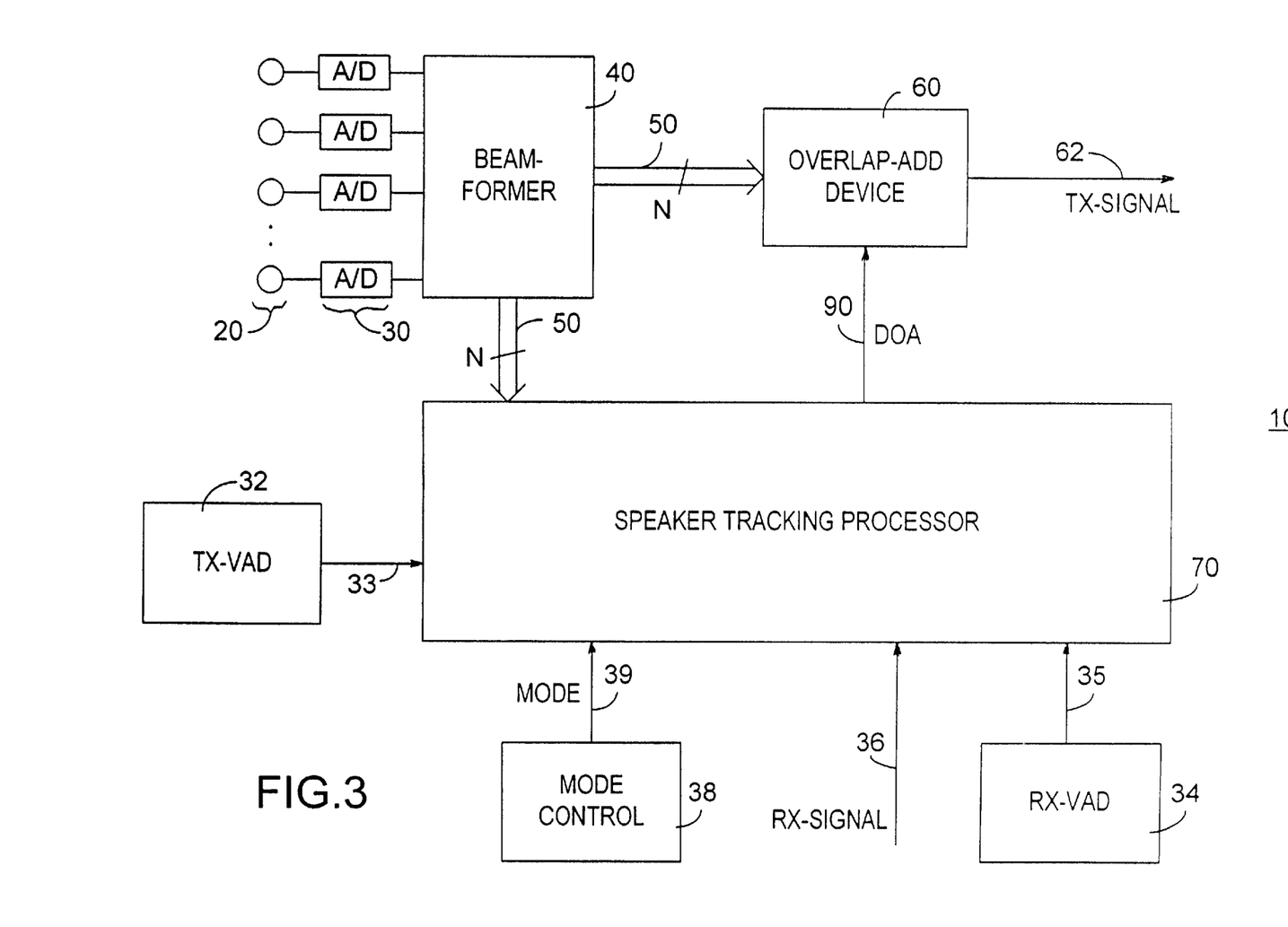
FIG. 3 is a block diagram showing the components of the speaker tracking system, according to the present invention.

FIG. 3 shows the structure of the speaker tracking system 10. As shown, each of the acoustic sensors 20 is operatively connected to an A/D converter 30 so that the electro-acoustic signals from the acoustic sensors 20 are conveyed to a beamformer 40 in a digital form. The beamformer 40 is used to form N different beams covering N different directions in order to cover the whole area of interest. The N signal outputs 50 from the beamformer 40 are conveyed to a speaker tracking processor 70 which compares the N signal outputs 50 to determine the highest signal-to-noise levels among the N signal outputs 50. Accordingly, the speaker tracking processor 70 selects the most favorable direction for receiving the voice of a speaker for a certain time window and sends a signal 90 to a beam power selecting device, such as an overlap-add device 60. The signal 90 includes information indicating a direction of arrival (DOA) which is the most favorable detection direction. The overlap-add device 60, which also receives the N output signals 50 from the beamformer 40, selects the output signal according to the DOA sent by the speaker tracking processor 70. The beamformer 40 updates the N output signals 50 with a certain sampling frequency F and sends the N updated output signals 50 to the speaker tracking processor 70 in order to update the DOA. If the favorable detection direction of the voice does not change, the DOA remains the same and there is no need for the overlap-add device 60 to change to a new output signal. However, if the speaker moves or a different speaker speaks, the speaker tracking processor 70 sends out a new DOA signal 90 to the overlap-add device 60. Accordingly, the overlap-add device selects a new output signal among the N updated output signals 50. In order to avoid an abrupt change in the sound level as conveyed by the Tx-Signal 62, an overlap-add procedure is used to join the successive beamformer output segments corresponding to the old beam direction and the new beam direction.

In a high ambient noise environment, it is preferred that a voice activity detection device is used to differentiate noise from the voice of the human speakers. With a preset detection level, a voice activity detection device can indicate when a voice is present and when there is only noise. As shown, a voice-activity detector (Tx-VAD) 32 is used to send a signal 33 to the speaker tracking processor 70 to indicate when any of the human speakers speaks and when it is a noise-only period. Similarly, a voice-activity detector (Rx-VAD) 34 is used to send a signal 35 to the speaker tracking processor 70 to indicate when the voice of the far-end human speaker is detected and when there is no voice but noise from the far-end being detected. It should be noted that the voice-activity detector 34 can be implemented near the speaker tracking processor 70 as part of the speaker tracking system 10, or it can be implemented at the transmitter end of the far-end human speakers for sending information related to the signal 35 to the speaker tracking processor 70.

Moreover, a signal 36 responsive to the sound from the far-end human speaker is conveyed to the speaker tracking processor 70 for babble noise estimation, as described in conjunction with FIG. 4 below.

Preferably, the update frequency P for direction estimation is between 8 Hz to 50 Hz, but it can be higher or lower. With an update frequency of 8 Hz to 50 Hz, the DOA as indicated by signal 90 generally represents a favorable detection direction within a time window defined by 1/F, which ranges from 20 ms to 125 ms.

Optionally, the speaker tracking system 10 is allowed to operate in at least two different modes:

1) in the ON mode, the speaker tracking system 10 periodically compares the beam power of each beam in order to determine the most favorable detection direction in a continuous fashion, and
2) in the FREEZE mode, the speaker tracking system 10 is allowed to compare the beam power of each beam in order to determine the most favorable detection direction within a short period of steering time (a few seconds, for example) and the most favorable detection direction so determined is kept unchanged after the steering time has expired.

In order to select the operating modes, a MODE control device 38 is used to send a MODE signal 39 to the speaker tracking processor 70.

Preferably, the overlap-add procedure for directional smoothing is carried out as follows. The overlapping frames of the output of the beamformer 40 are windowed by a trapezoidal window and the overlapping windowed frames are added together. The slope of the window must be long enough to smooth the effect arising from the changing of beam directions. Accordingly, the Tx-Signal 62 represents the beam power of a selected beam within a sampling window as smoothed by the overlap-add device 60. A typical overlap time is about 50 ms.

Figure 4:
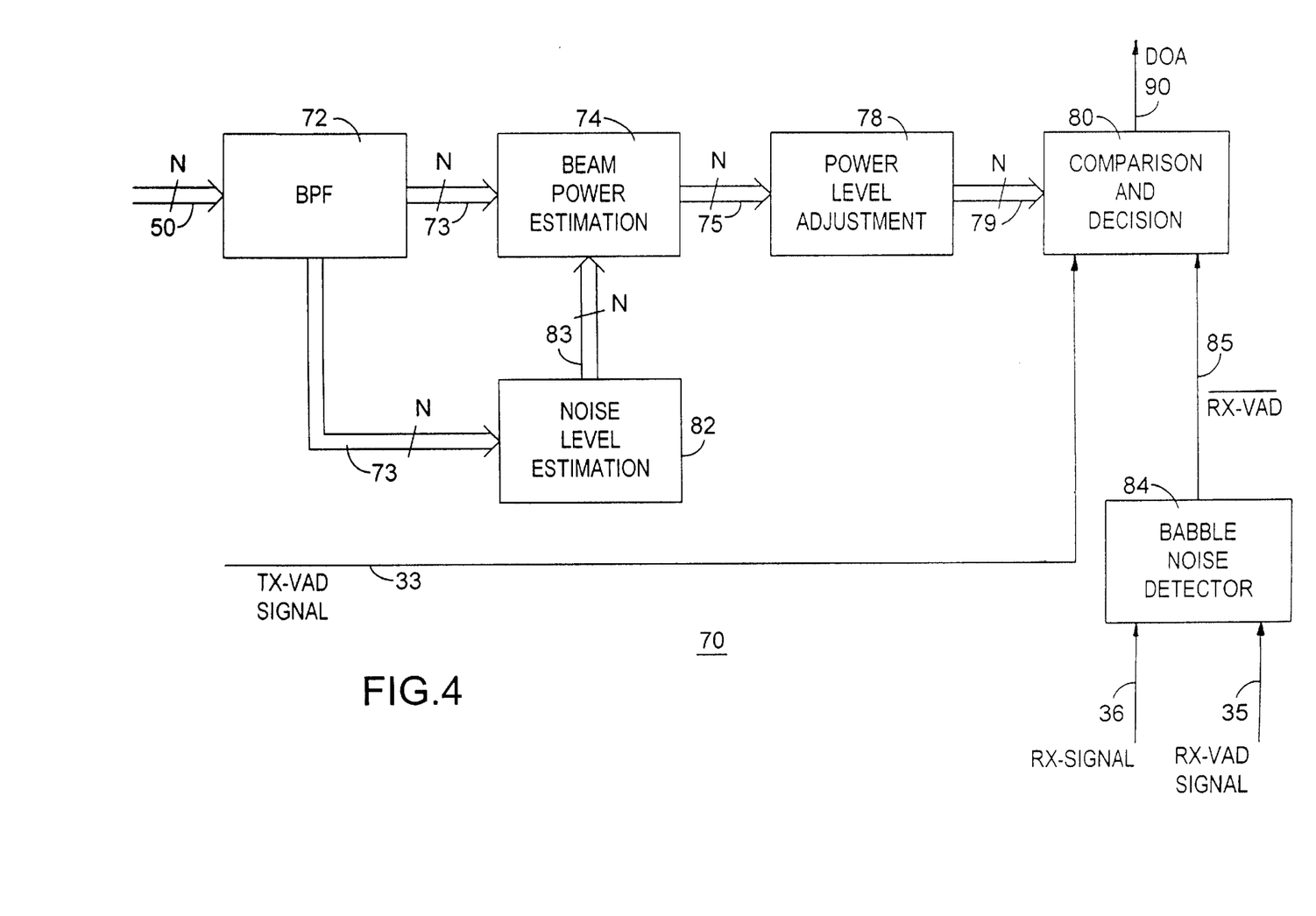
FIG. 4 is a block diagram showing the detail of the speaker tracking processor of the present invention.

FIG. 4 illustrates the direction estimation process carried out by the speaker tracking processor 70 of the present invention. As shown, each of the N output signals 50 is filtered by a band-pass filter (BPF) 72 in order to optimize the speech-to-ambient noise ratio and the beamformer directivity. Preferably, the band-pass filter frequency is about 1 kHz to 2 kHz. The band-pass filtered signals 73 are simultaneously conveyed to a noise-level estimation device 82 and a beam-power estimation device 74. A Tx-VAD signal 33 provided by the voice-activity detector 32 (FIG. 3) is conveyed to both the noise-level estimation device 82 and a comparison and decision device 80.

During noise-only periods as indicated by the TX-VAD signal 33, the noise-level estimation device 82 estimates the noise power level of each beam. Preferably, the noise power level is estimated in a first order Infinite Impulse Response (IIR) process as described by the following equation:

$$n_{k,i+1} = \alpha_1 n_{k,i} + (1-\alpha_1)\Sigma_{FLEN} x^2_{k,i}/\text{FLEN},$$

where $n_{k,i}$ is the noise power level of the $k^{th}$ beam at the sampling window i; $\alpha_1$ is a constant which is smaller than 1; and $x_{k,i}$ is the $i^{th}$ frame of the $k^{th}$ band-pass filtered beamformer output among the N filtered signal outputs 73 during a noise-only period. FLEN is the frame length used for noise estimation. The estimated noise power level 83 for each of the N beams is conveyed to the beam-power estimation device 74.

Based on the band-pass filtered beamformer outputs 73 and the estimated noise power levels 83 for the corresponding beam directions, the beam-power estimation device 74 estimates the power level of each band-pass filtered output 73 in a process described by the following equation:

$$p_{k,i+1} = \alpha_2 p_{k,i} + (1-\alpha_2)\Sigma_{FLEN} x^2_{k,i}/(\text{FLEN}^* n_{k,i}),$$

where $p_{k,i}$ is the power level of the $k^{th}$ beam at the sampling window i, and $\alpha_2$ is a constant which is smaller than 1. Each power level is normalized with the noise level of the corresponding beam. This normalization process helps bring out only the power differences in the voice in different beam directions. It also helps reduce the differences in the power level due to the possible differences in the beam-width.

The estimated power levels $p_{k,i+1}$ (k=1,N) are then sent out as signals 75 to a power level adjuster 78 for selecting the next DOA.

Because the distance from the acoustic sensors 20 to speaker A is shorter than the distance from the acoustic sensors 20 to speaker B, the sound level from speaker B as detected by the acoustic sensors is generally lower. It is possible that a different weighting factor is given to the signals responsive to the sound of different speakers in order to increase the level of a weaker sound. For example, a weighting factor of 1 can be given to the beams that are directed towards the general direction of speaker B, while a weighting factor of 0.8 can be given to the beams that are directed towards the general direction of speaker A. However, if it is desirable to design a speaker tracking system that favors the driver, then a larger weighting factor can be given to the beams that are directed towards to the general direction of the driver.

The adjusted power levels 79 are conveyed to a comparison and decision device 80.

It is also possible that the normalization device 76 and the power level adjuster 78 are omitted so that the estimated power levels from the beam-power estimation device 74 are directly conveyed to the comparison and decision device 80. Based on the power levels received, the comparison and decision device 80 select the highest power.

When the far-end speaker in a remote location talks to the near-end speakers (A,B in FIG. 1), the voice of the far-end speaker is reproduced on a loudspeaker of a hands-free telecommunication device (FIG. 2). The voice of the far-end speaker on the loudspeaker may confuse the comparison and decision device 80 as to which should be used for the selection of the DOA. Thus, it is preferable to select the next DOA when the far-end speaker is not talking. For that purpose, it is preferable to use a babble noise detector 84 to generate a signal 85 indicating the speech inactivity period of the far-end human speaker, based on the Rx-Signal 36 and the Rx-VAD Signal 35. Furthermore, it is preferable to select the next DOA during a period of near-end speech activity (Tx-VAD=1). When Tx-VAD=1, someone in the car is talking.

Thus, only during near-end speech activity and far-end speech inactivity, the power level of the currently selected direction is compared to those of the other directions. If one of the other directions has a clearly higher level, such as the difference is over 2 dBs, for example, that direction is chosen as the new DOA. The major advantage of the VADs is that the speaker tracking system 10 only reacts to true near-end speech and not some noise-related impulses, or the voice of the far-end speaker from the loudspeaker of the hands-free phone system.

Thus, what has been described is a speaker tracking system which can be used in a hands-free car phone. However, the same speaker tracking system can be used in a different environment such as a video or teleconferencing situation. Furthermore, in the description taken in conjunction with FIGS. 1 to 4, the electro-acoustic signals from the acoustic sensors 20 are conveyed to the beamformer 40 in a digital from. Accordingly, a filter-and-sum beamforming technique is used for beamforming. However, the electro-acoustic signal from the acoustic sensors 20 can also be conveyed to the beamformer 40 in an analog from. Accordingly, a delay-and-sum technique can be used for beamforming. Also, the acoustic sensors 20 can be arranged in a 2D array or a 3D array in different arrangements. It is understood that the beamforming process using a single array can only steer a beam in one direction, the beamforming process using a 2D array can steer the beam in two directions. With a 3D acoustic sensor the beam distance of the speaker can also be determined, in addition to the directions. In spite of the complexity of a system the uses a 2D or 3D acoustic sensor array, the principle of speaker tracking remains the same.

Therefore, although the invention has been described with respect to a preferred embodiment thereof, it will be understood by those skilled in the art that the foregoing and various other changes, omissions and deviations in the from and detail thereof may be made without departing from the spirit and scope of this invention.

What is claimed is:

1. A system having a plurality of acoustic sensors for tracking at least one human speaker in an environment having ambient noise in order to effectively detect a voice from the human speaker, wherein the human speaker and the acoustic sensors are separated by a speaker distance along a speaker direction and wherein the human speaker is allowed to move relative to the acoustic sensors resulting in a change in the speaker direction within an angular range, and wherein each acoustic sensor produces an electrical signal responsive to the voice of the human speaker, said system comprising:

a) a beamformer operatively connected to the acoustic sensors to receive the electrical signal, wherein the beamformer is capable of forming N different beams, wherein N is a positive integer greater than 1 and each beam defining a favorable direction to detect the voice from the human speaker by the acoustic sensors and each different beam is directed in a substantially different direction within the angular range, said beamformer further outputting an output signal indicative of a beam power for each beam when the acoustic sensors detect the voice, wherein the beam power is normalized with a noise level in the corresponding beam; and b) a comparator operatively connected to said beamformer for comparing the normalized beam power of each beam in order to determine a most favorable direction to detect the voice of the human speaker, wherein said comparator compares the normalized beam power of each beam periodically so as to determine the most favorable direction to detect the voice of the human speaker according to the change in the speaker direction.

2. The system of claim 1, further comprising a voice activity detection device which is capable of distinguishing the noise from the voice of the human speaker in order to define a near-end speech activity period when the voice from the human speaker is detected during a detection period, wherein the comparator determines the most favorable detection direction only in the near-end speech activity period.

3. The system of claim 2, wherein the voice activity detection device further defines a near-end speech inactivity period when the voice of the human speaker using the system is not detected in the detection period, said system further comprising a power estimation device and a noise level estimation device operatively connected to the beamformer to receive the beam power of each beam, wherein the noise level estimation device estimates an ambient noise in the near-end speech inactivity period and wherein the power estimation device estimates the beam power of each beam based on the ambient noise and provides the estimated beam power to the comparator in order for the comparator to determine the most favorable detection direction.

4. The system of claim 3, further comprising a band-pass filter to filter the output signal from the beamformer for improving a speech-to-ambient noise ratio and beamformer directivity prior to the beam power of each beam from the beamformer being conveyed to the power estimation device and the noise level estimation device.

5. The system of claim 1, further comprising a transceiver to transmit the voice of the human speaker utilizing the system to communicate with a far-end human speaker in a communication period and to receive a far-end voice signal responsive to a voice from the far-end human speaker during the communication period.

6. The system of claim 5, further comprising a voice activity detection device which is capable of distinguishing noise in the far-end from the voice of the far-end human speaker to indicate a far-end speech inactivity period, wherein the comparator determines the most favorable detection direction only in the far-end speech inactivity period.

7. The system of claim 6, further comprising a babble noise detector for receiving the far-end voice signal and a signal from the voice activity detection device in order to generate a far-end speech inactivity signal conveyed to the comparator for indicating the far-end speech inactivity period.

8. The system of claim 1, wherein the comparator compares the beam power of each beam within a predetermined time period in order to determine the most favorable detection direction and wherein the most favorable detection direction determined within the predetermined time period is kept unchanged after the predetermined time period has expired.

9. A method of tracking at least one human speaker using a plurality of acoustic sensors in order to effectively detect a voice from the human speaker in an environment having ambient noise, wherein the human speaker and the acoustic sensors are separated by a speaker distance along a speaker direction and wherein the human speaker is allowed to move relative to the acoustic sensors resulting in a change in the speaker direction within an angular range, and wherein each acoustic sensor produces an electrical signal responsive to the voice of the human speaker, said method comprising the steps of:

a) forming N different beams from the electrical signal, wherein N is a positive integer greater than 1 and each beam defining a favorable direction to detect the voice of the human speaker by the acoustic sensors and each different beam is directed in a substantially different direction within the angular range, wherein each beam has a beam power responsive to the electrical signal and normalized with a noise level in the corresponding beam; and b) periodically comparing the normalized beam power of each beam in order to determine a most favorable direction to detect the voice of the human speaker according to the change of the speaker direction.

10. The method of claim 9, further comprising the step of distinguishing the noise from the voice of the human speaker for determining a near-end speech activity period when the voice of the human speaker is detected in a detection period so that the beam power of each beam in the detection period is compared to determine the most favorable detection direction only in the near-end speech activity period.

11. The method of claim 10, further comprising the steps of:

determining a near-end speech inactivity period when the voice of the human speaker is not detected in the detection period;

estimating an ambient noise during the near-end speech inactivity period; and estimating the beam power of each beam based on the ambient noise so as to use the estimated beam power of each beam to determine the most favorable detection direction.

12. The method of claim 9, wherein the human speaker communicates with a far-end human speaker at a remote location in a communication period, said method further comprising the step of receiving a voice of the far-end human speaker and indicating a far-end speech inactivity period so that the beam power of each beam is compared to determine the most favorable detection direction only in the far-end speech inactivity period.

13. The method of claim 9, wherein each beam has a beamformer output related to the power of said beam, the method further comprising the step of frequency filtering the beamformer output of each beam for improving a speech-to-ambient noise ratio and beamformer directivity prior to determining the most favorable detection direction in step (b).

14. The method of claim 13, wherein the beamformer output is filtered by a band-pass filter having a frequency range of 1 kHz and 2 kHz.

15. The method of claim 13, wherein the most favorable detection direction is updated with a frequency ranging from 8 Hz to 50 Hz in order to obtain a new most favorable detection direction for replacing a current most favorable detection direction, said method further comprising the step of adding a part of the beamformer output of the current most favorable detection direction to a part of the beamformer output of the new most favorable detection direction in order to smooth out the beamformer output difference between the new and the current most favorable detection direction.

16. The method of claim 9, wherein the beam power comparing step is carried out within a predetermined time period and wherein the most favorable direction so determined is kept unchanged after the predetermined time period has expired.

17. The method of claim 9, wherein the acoustic sensors are arranged in a single array.

18. The method of claim 9, wherein the acoustic sensors are arranged in a 2D array.

19. The method of claim 9, wherein the acoustic sensors are arranged in a 3D array.

20. A method of tracking at least one human speaker using a plurality of acoustic sensors in order to effectively detect a voice from the human speaker in an environment having ambient noise, wherein the human speaker and the acoustic sensors are separated by a speaker distance along a speaker direction and wherein the human speaker is allowed to move relative to the acoustic sensors resulting in a change in the speaker direction within an angular range, and wherein each acoustic sensor produces an electrical signal responsive to the voice of the human speaker, said method comprising the steps of:

a) forming N different beams from the electrical signal, wherein N is a positive integer greater than 1 and each beam defining a favorable direction to detect the voice of the human speaker by the acoustic sensors and each different beam is directed in a substantially different direction within the angular range, wherein each beam has a beam power responsive to the electrical signal; and b) periodically comparing the beam power of each beam in order to determine a most favorable direction to detect the voice of the human speaker according to the change of the speaker direction, wherein the most favorable detection direction is updated with a frequency ranging from 8 Hz to 50 Hz in order to obtain a new most favorable detection direction for replacing a current most favorable detection direction.

21. The method of claim 20, wherein the current most favorable detection direction is replaced by the new most favorable detection direction only when the beam power difference between the new and the current most favorable detection direction exceeds 2 dBs.

22. A method of tracking at least one human speaker using a plurality of acoustic sensors in order to effectively detect a voice from the human speaker in an environment having ambient noise, wherein the human speaker and the acoustic sensors are separated by a speaker distance along a speaker direction and wherein the human speaker is allowed to move relative to the acoustic sensors resulting in a change in the speaker direction within an angular range, and wherein each acoustic sensor produces an electrical signal responsive to the voice of the human speaker, said method comprising the steps of:

a) forming N different beams from the electrical signal, wherein N is a positive integer greater than 1 and each beam defining a favorable direction to detect the voice of the human speaker by the acoustic sensors and each differernt beam is directed in a substantially different direction within the angular range, wherein each beam has a beam power responsive to the electrical signal; and b) periodically comparing the beam power of each beam in order to determine a most favorable direction to detect the voice of the human speaker according to the change of the speaker direction, wherein the method further comprises the step of assigning a weighting factor to each beam according to the speaker direction in order to adjust the beam power of each beam prior to determining the most favorable detection direction in step (b).

23. A method of tracking at least one human speaker using a plurality of acoustic sensors in order to effectively detect a voice from the human speaker in an environment having ambient noise, wherein the human speaker and the acoustic sensors are separated by a speaker distance along a speaker direction and wherein the human speaker is allowed to move relative to the acoustic sensors resulting in a change in the speaker direction within an angular range, and wherein each acoustic sensor produces an electrical signal responsive to the voice of the human speaker, said method comprising the steps of:

a) forming N different beams from the electrical signal, wherein N is a positive integer greater than 1 and each beam defining a favorable direction to detect the voice of the human speaker by the acoustic sensors and each different beam is directed in a substantially different direction within the angular range, wherein each beam has a beam power responsive to the electrical signal; and b) periodically comparing the beam power of each beam in order to determine a most favorable direction to detect the voice of the human speaker according to the change of the speaker direction, wherein the method farther comprises the step of assigning a weighting factor to each beam according to the speaker location in order to adjust the beam power of each beam prior to determining the most favorable detection direction in step (b).

\* \* \* \* \*

UNITED STATES PATENT AND TRADEMARK OFFICE
CERTIFICATE OF CORRECTION

PATENT NO.     : 6,449,593 B1
DATED          : September 10, 2002
INVENTOR(S)    : Valve It is certified that error appears in the above-identified patent and that said Letters Patent is hereby corrected as shown below:

<u>Title page,</u>
Item [56], U.S. PATENT DOCUMENTS,
"Elko et al………367/121", should be -- Elko et al……….381/92 --

<u>Column 5,</u>
Line 36, replace "P" with -- F --.

<u>Column 7,</u>
Line 51, replace "from" with -- form --.

Signed and Sealed this

Sixth Day of May, 2003

JAMES E. ROGAN
*Director of the United States Patent and Trademark Office*